United States Patent
Carcaterra et al.

(10) Patent No.: US 9,631,692 B2
(45) Date of Patent: Apr. 25, 2017

(54) VIBRATION DAMPING DEVICE

(71) Applicant: UNIVERSITA DEGLI STUDI DI ROMA "LA SAPIENZA", Rome (IT)

(72) Inventors: Antonio Carcaterra, Rome (IT); Adnan Akay, Pittsburg, PA (US)

(73) Assignee: UNIVERSITA DEGLI STUDI DI ROMA "LA SAPIENZA", Rome (IT)

( * ) Notice: Subject to any disclaimer, the term of this patent is extended or adjusted under 35 U.S.C. 154(b) by 302 days.

(21) Appl. No.: 13/910,752

(22) Filed: Jun. 5, 2013

(65) Prior Publication Data

US 2014/0008162 A1    Jan. 9, 2014

Related U.S. Application Data

(63) Continuation of application No. 11/887,138, filed as application No. PCT/EP2006/061250 on Mar. 31, 2006, now abandoned.

(30) Foreign Application Priority Data

Mar. 31, 2005 (IT) .................. RM2005A0150

(51) Int. Cl.
*F16F 7/10* (2006.01)
*F16F 15/00* (2006.01)

(52) U.S. Cl.
CPC .............. *F16F 7/1028* (2013.01); *F16F 7/10* (2013.01); *F16F 15/005* (2013.01)

(58) Field of Classification Search
CPC ..................................................... F16F 7/116
USPC ............ 188/378, 379, 380; 267/136, 140.11
See application file for complete search history.

(56) References Cited

U.S. PATENT DOCUMENTS

| | | | |
|---|---|---|---|
| 3,314,503 A | * | 4/1967 | Neubert .................. F16F 15/10 174/42 |
| 4,736,701 A | | 4/1988 | Kondo et al. |
| 5,431,261 A | | 7/1995 | Olgac et al. |
| 5,583,324 A | | 12/1996 | Thomasen |
| 5,627,425 A | | 5/1997 | Kaida et al. |
| 6,533,257 B1 | | 3/2003 | Clark |
| 6,779,404 B1 | | 8/2004 | Brincker |
| 2005/0021315 A1 | | 1/2005 | Alleai |
| 2007/0222126 A1 | | 9/2007 | Yamaguchi et al. |

FOREIGN PATENT DOCUMENTS

| | | | |
|---|---|---|---|
| DE | 100 23 411 | 11/2001 | |
| JP | 62 233537 | 8/1987 | |
| JP | 63235740 A | * 9/1988 | ............. F16F 15/02 |
| JP | 09119477 | 5/1997 | |

(Continued)

OTHER PUBLICATIONS

JP 63-235740 (no date).*

*Primary Examiner* — Nicholas J Lane
(74) *Attorney, Agent, or Firm* — Pearl Cohen Zedek Latzer Baratz LLP

(57) ABSTRACT

The damping device comprises a cluster of resonators with a predetermined frequency distribution, that, when attached to a main or 'master' structure, is capable of absorbing irreversibly its vibrational or/and acoustic energy produced by a vibrating body. the density of natural frequencies of the plurality of resonators is comprised within a curve that lies below the envelope curve determined by the formula, $e(\ )=1/-1$.

3 Claims, 14 Drawing Sheets

(56) References Cited

FOREIGN PATENT DOCUMENTS

Figure 1:
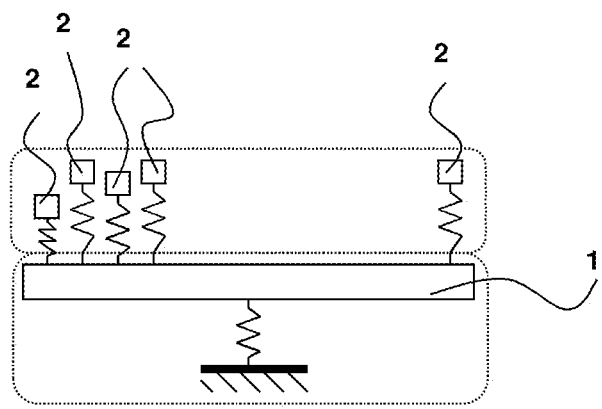

| JP | 2006 077812 | 3/2006 |
| JP | 2006077812 | 3/2006 |
| WO | WO 2004046414 | 6/2004 |

\* cited by examiner

VIBRATION DAMPING DEVICE

FIELD OF THE INVENTION

The invention relates to a vibration damping device for damping vibrations occurring in structures or bodies, by means of resonators incorporated in the damping device.

BACKGROUND ART

The use of vibration damping devices based on the principle of resonators included in the device are known in the art. They are used for damping vibrations generated in structures or bodies, either still or in motion, when subject to impulses or forces that cause vibrations.

A damping device which uses resonators as active dynamic absorbers is disclosed in U.S. Pat. No. 5,431,261 where a structure with a large mass is damped by coupling thereto a damping member of smaller mass and continuously monitoring the frequency of excitation of the structure produced by applied load and the displacement of the damping member. The monitored frequency of excitation and displacement of the damping member are processed together with data relative to the mass, stiffness and damping characteristic of the damping member. A signal is outputted to produce a force acting on the damping member proportional to the displacement of the damping member with a controlled time delay to produce a frequency of vibration in the damping member substantially equal to the monitored frequency of excitation of the structure, this produces resonance of the damping member substantially at the monitored frequency of excitation and is effective to damp substantially the vibrations of the structure at the monitored frequency of excitation. The output signal is variable to produce resonance of the damping member variable over a range of frequencies including the natural frequency of vibration of the structure.

The results achieved by means of this damping device are not satisfactory. The harmonic response of the global system after an impulse follows a curve which reaches the desired level after too long a time.

In order to improve the damping efficiency of the damping device to bring it to a level satisfactory for engineering applications, solutions are known which provide for utilisation of damping means using viscosity effects, either alone or in addition to active dampers. However, in order to achieve a rapid damping effect such devices are too heavy, which is not always acceptable in many application, e.g. on spatial or flying vehicles.

SUMMARY OF THE INVENTION

It is therefore an objective of the invention to provide a vibration damping device which overcomes the drawbacks set forth and achieves a very high efficiency in a manner that it brings the magnitude of the vibration displacement of the body below the desired level in a very short time after the application of the impulse, such that it can be considered as nearly immediate from a practical point of view.

Another objective of the invention is to provide a damping device which has a high efficiency, while maintaining a very low weight.

This result is reached by means of a vibration damping device for damping vibrations of a vibrating or oscillating entity, e.g. a body or a structure or a gas mass, adapted to be connected to the vibrating entity, the vibrating entity defining at least one respective natural frequency ($\omega_M$), the damping device comprises a predetermined plurality (N) of resonators, the plurality (N) of resonators have respective natural frequencies ($\omega_N$), with values close to a curve determined by a first formula $$\delta_{opt}/N = \frac{1}{\sqrt{2\pi}} \exp\left\{-\frac{1}{2}[(\sigma/r)-(1/r)]^2\right\} \frac{d(\sigma/r)}{d\Omega},$$

$$\sigma/r = \frac{m\omega_M^3}{r}\Omega^3 \sin\Omega(\omega_M t_0)$$

where $m\omega_M^3/r$, $1/r$ and $t_0 = \pi/(4\omega_M)$ are the parameters defining the first formula, the density of natural frequencies of the plurality of resonators is comprised within a curve that lies below the envelope curve determined by a second formula, $$e(\Omega) = 1/|\Omega-1|$$

where $\Omega = \omega_N/\omega_M$ is a nondimensional frequency.

The vibration device according to the invention is very simple and versatile since its application can be applied to different fields of engineering with a very high damping efficiency, regardless of the size of the vibrating structures to which it is applied.

In the following description for conciseness reason we shall refer indifferently to a body or a structure, meaning under this definition also a fluid mass or any other entity which can vibrate. In the following a resonator has to be understood as being either mechanic or electric, depending on the specific embodiment it is used.

The damping device comprises a cluster of resonators with a predetermined frequency distribution, that, when attached to a main or "master" structure, is capable of absorbing irreversibly its vibrational or/and acoustic energy produced by a vibrating body. This is possible because a one-way energy flow, from the main structure to the set of resonators, is obtained. This effect holds, with a suitable design of the resonators, even with a mass of the energy sink largely smaller than that of the main structure.

This has the advantage of reducing the global structure weight of main structure and vibration damper, with the advantage that the damping device of the invention can be used in particularly demanding applications like on flying or spatial vehicles.

Moreover, the damping device is able to produce the desired damping effect, even in the absence of any source of energy dissipation by means of a viscous effect. The energy is permanently transferred from the vibrating master structure to the damping device because of its special design.

Thus, a damping device using this principle can be used to effectively damp the motion, either vibration or oscillation, of a large structure, conferring characteristics of lightness of the device itself, that cannot be achieved with traditional damping means.

Different applications of the damping device of the invention are suggested by way of non-limiting examples 1) a material having super-damping and lightness properties. The material should consist of a matrix with embedded micro/nano damping device. Thus, the macro-scale vibration of the matrix can be transformed into a micro-scale vibration of the cluster of resonators attached to the matrix.

2) a mechanical general device for damping surface vibration and for damping rotational vibration,
3) a mechanical device for damping building vibration,
4) a mechanical device for damping railways induced vibration,
5) an electromechanical device based on piezoelectric material to damp a vibrating surface,
6) an acoustic device for damping acoustic wave excitation,
7) a system for damping the motion of a floating vessel moved by waves and the simultaneous energy recovering from waves.

Other uses of the invention can be apparent to the person skilled in the art without departing from the scope of the invention.

SHORT DESCRIPTION OF THE FIGURES

Figure 4:
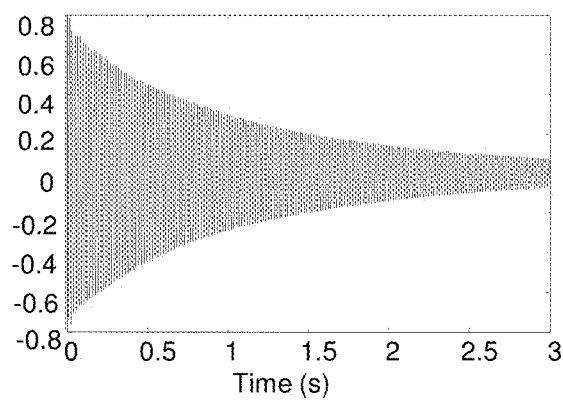
Figure 5:
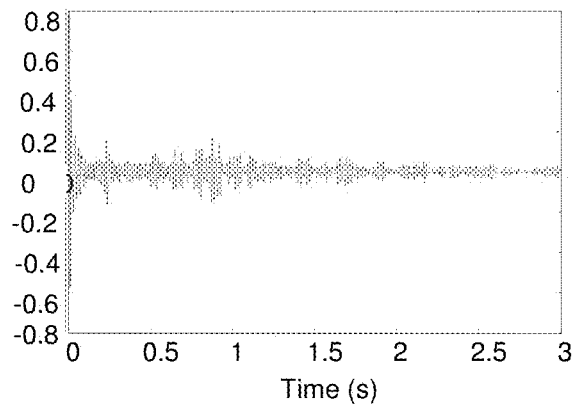
Figure 3:
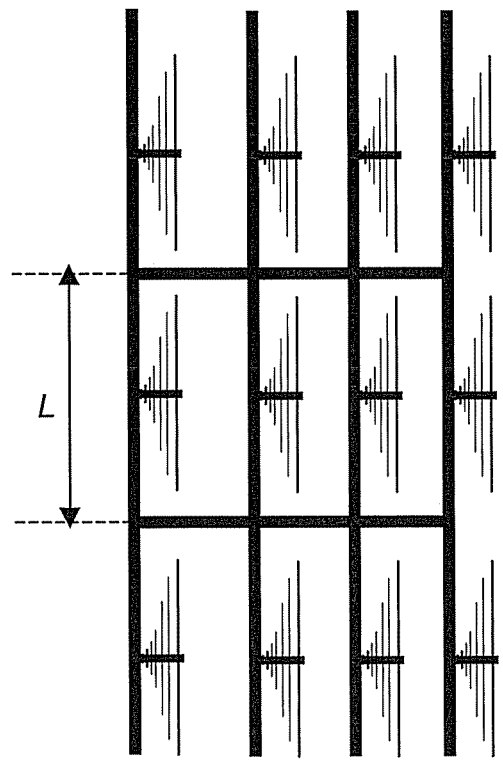
Figure 2:
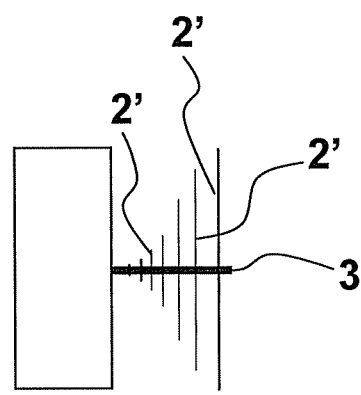
Figure 6:
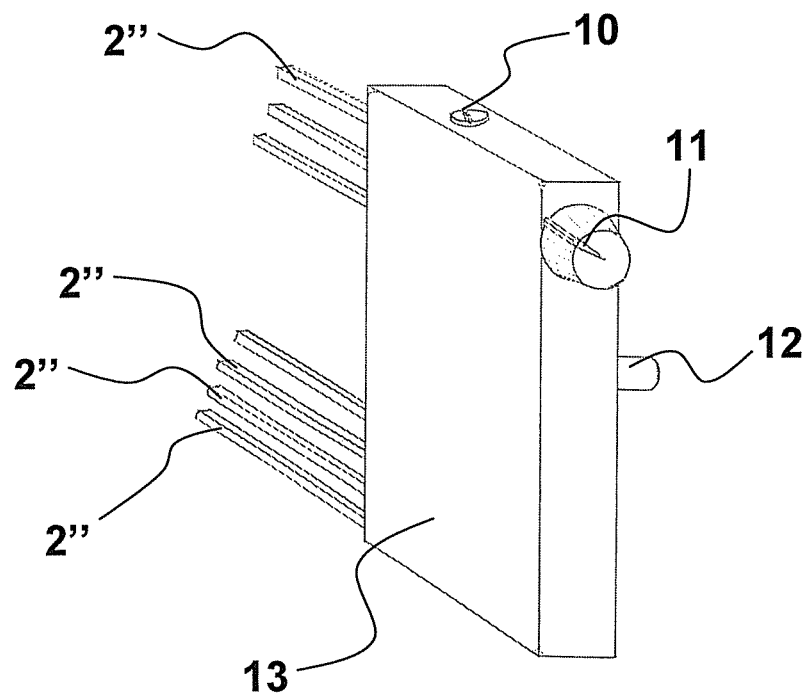
Figure 7:
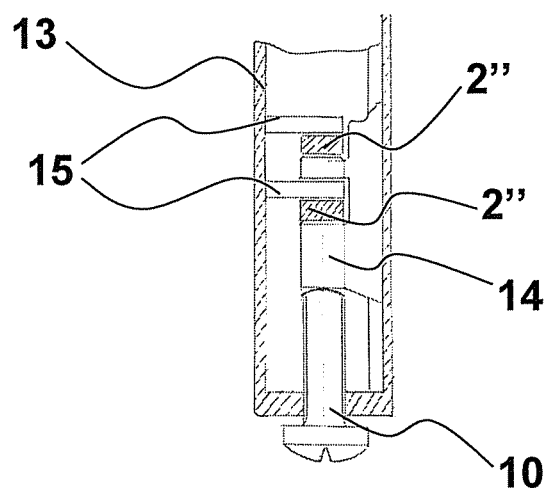
Figure 8:
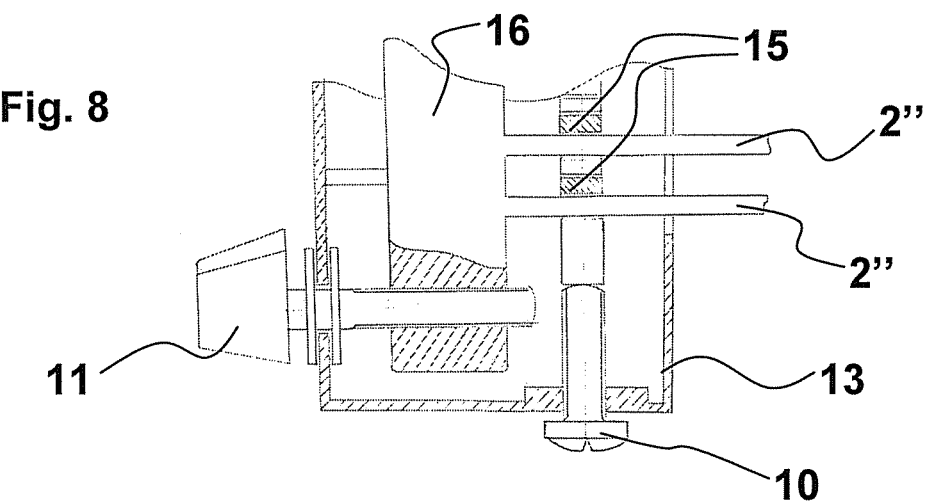
Figure 9:
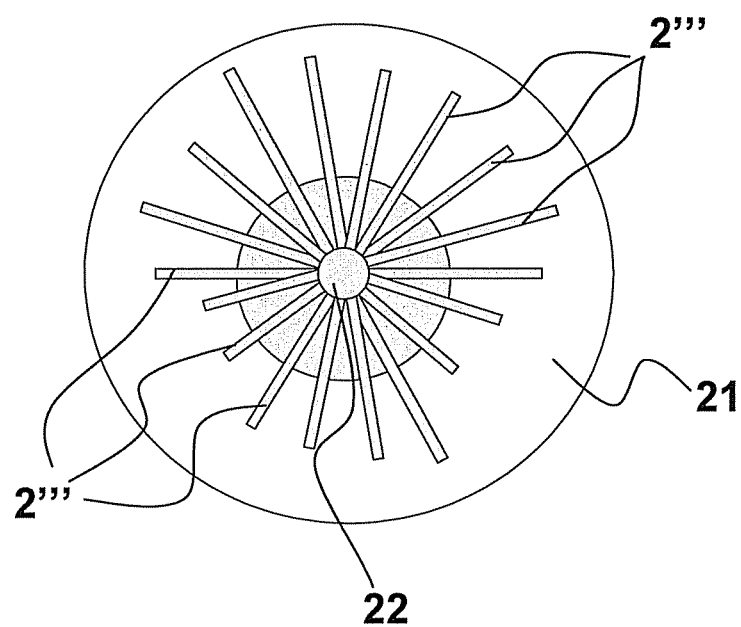
Figure 10:
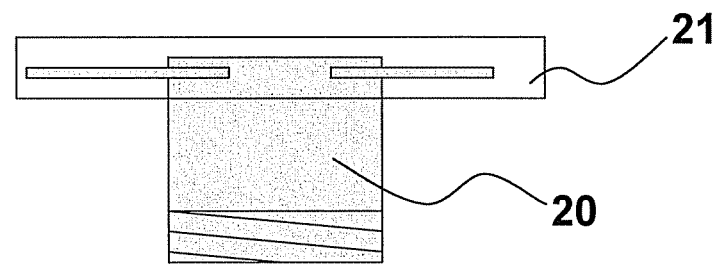
Figure 11:
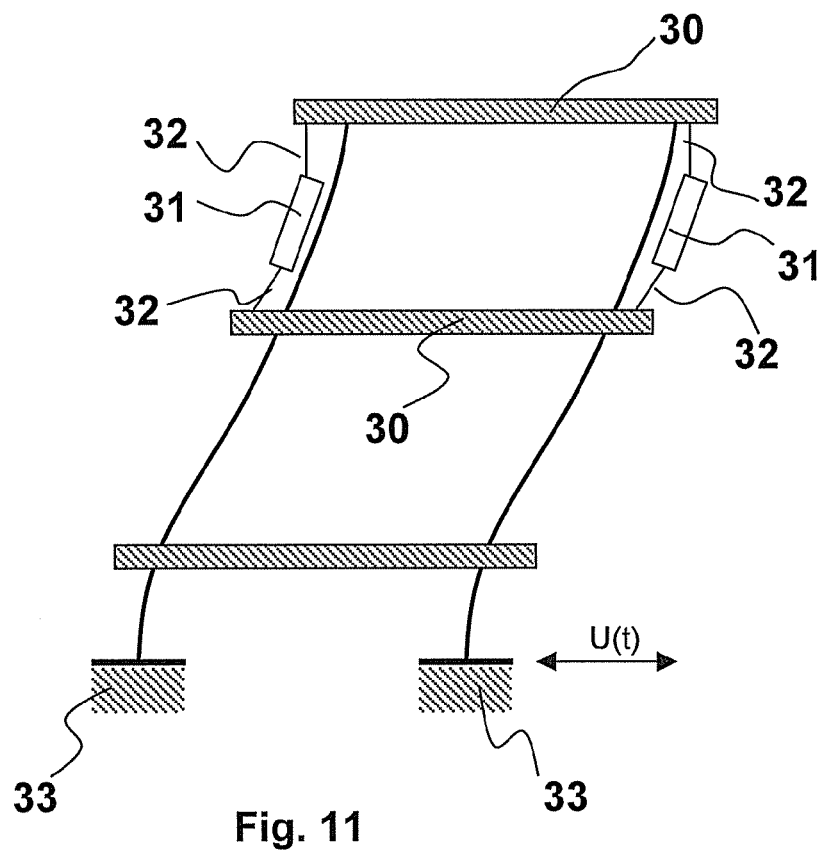
Figure 12:
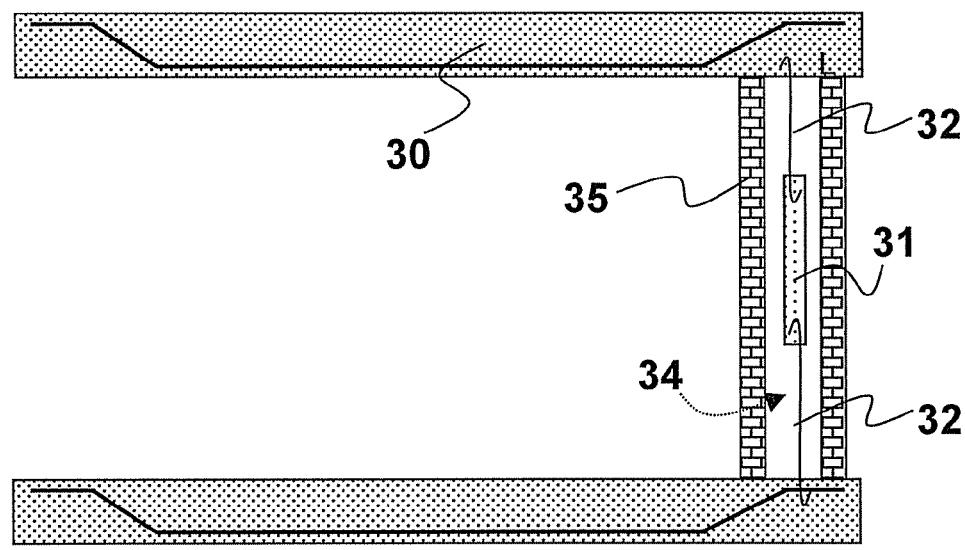
Figure 13:
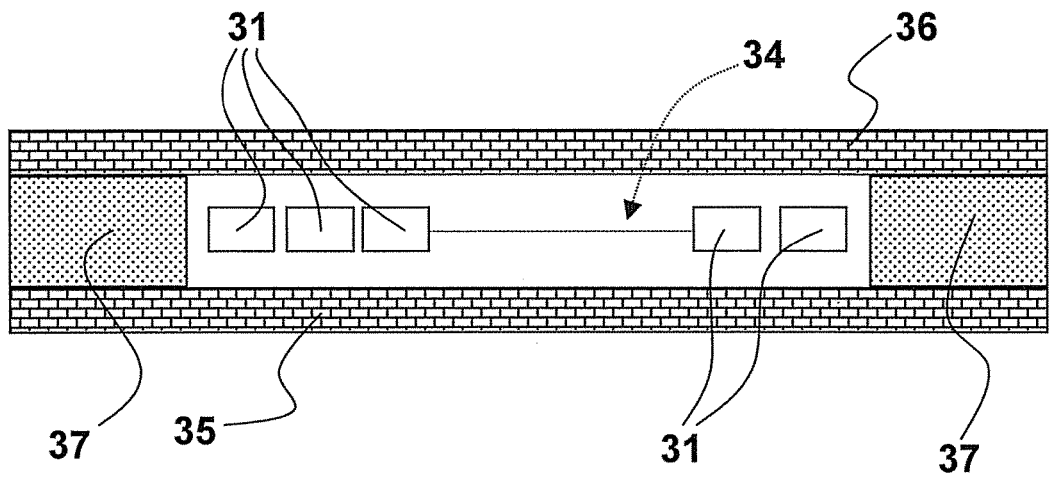
Figure 14:
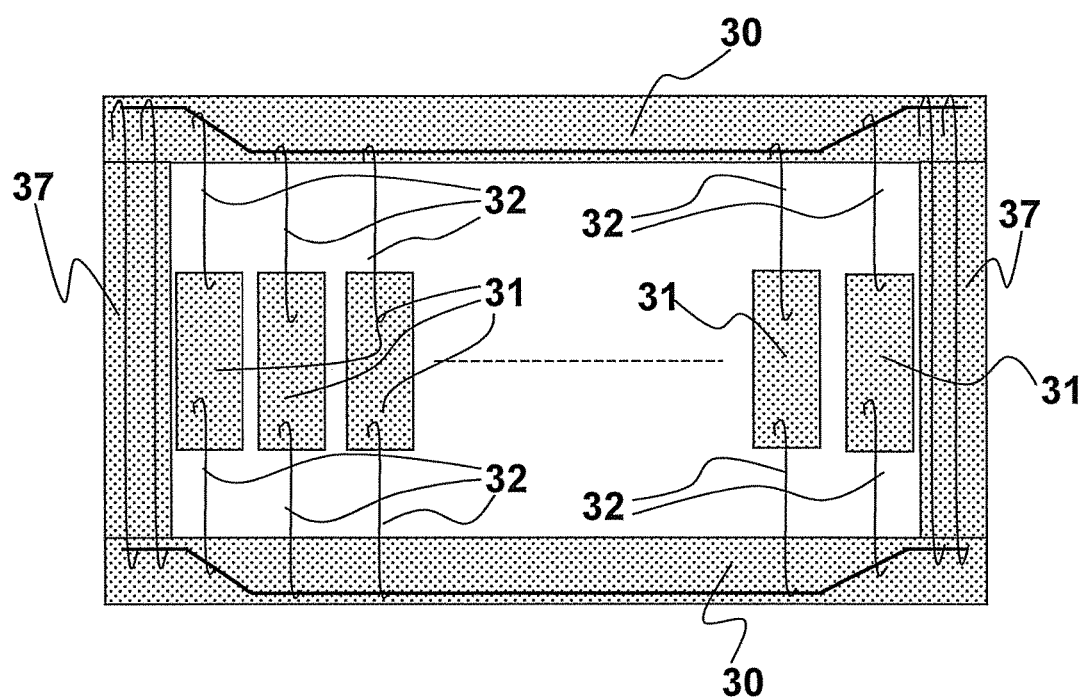
Figure 15:
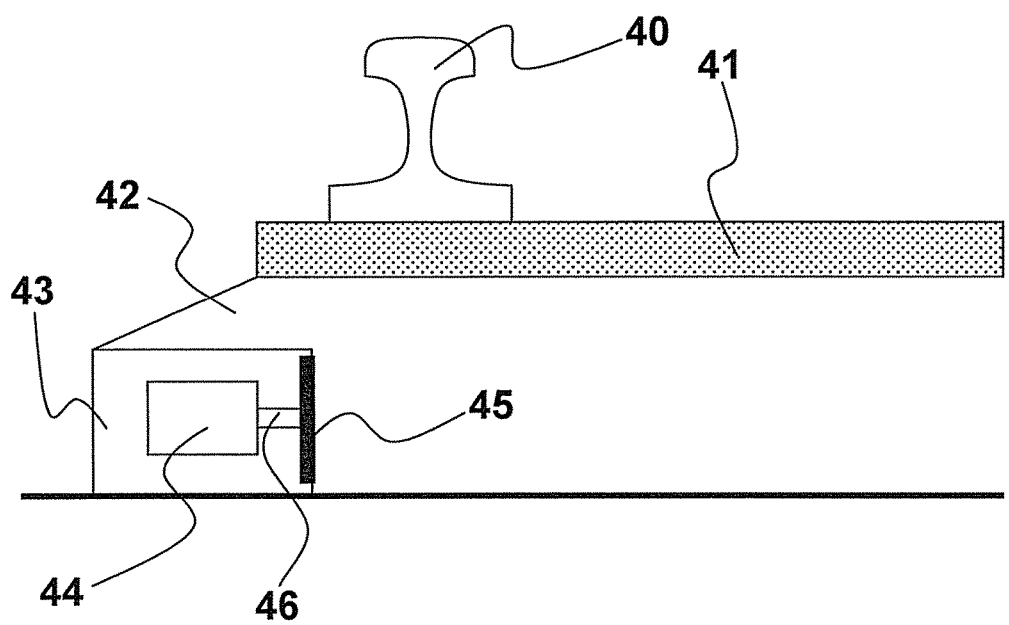
Figure 16:
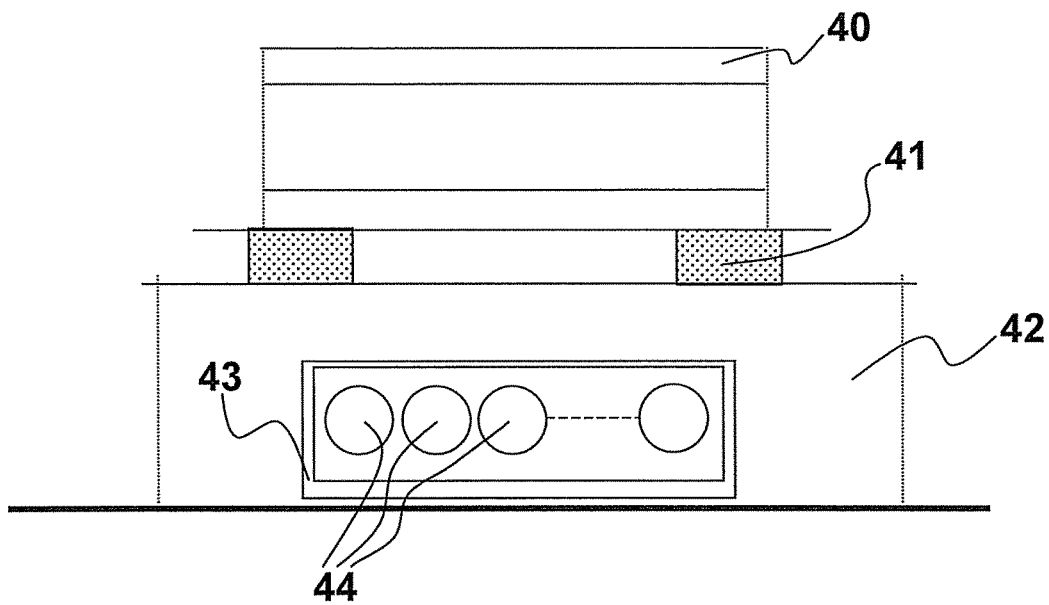
Figure 17:
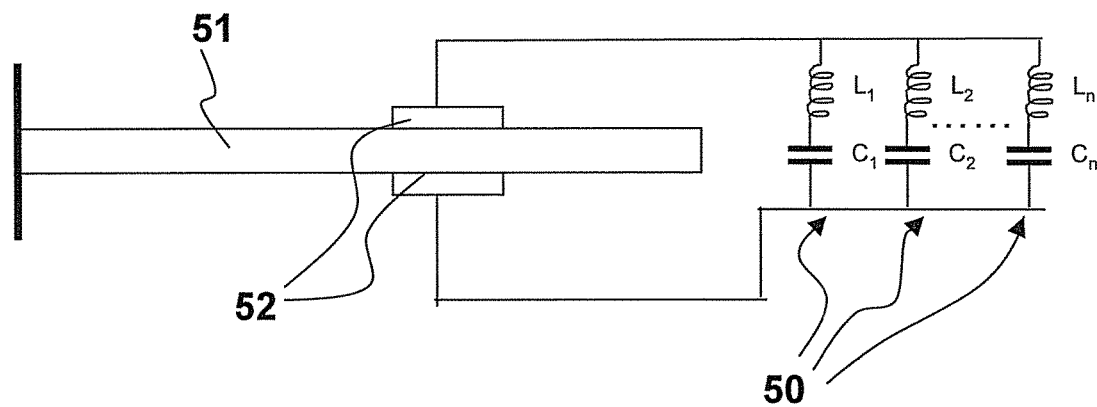
Figure 18:
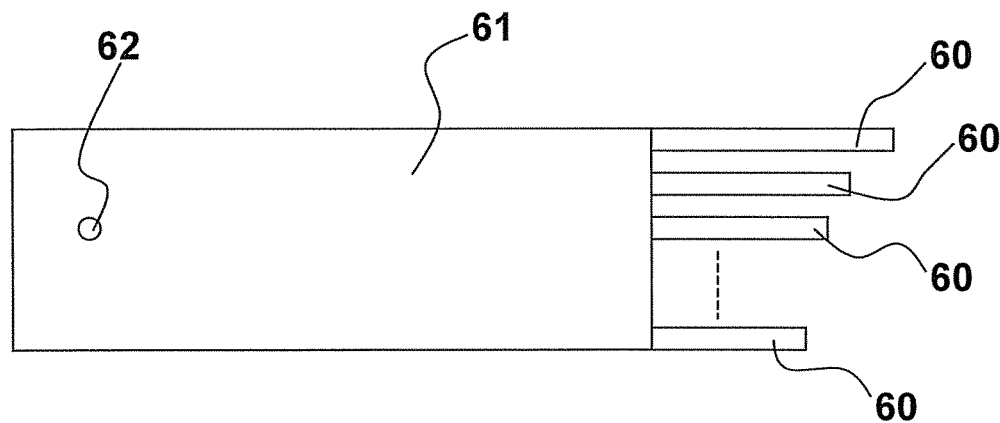
Figure 19:
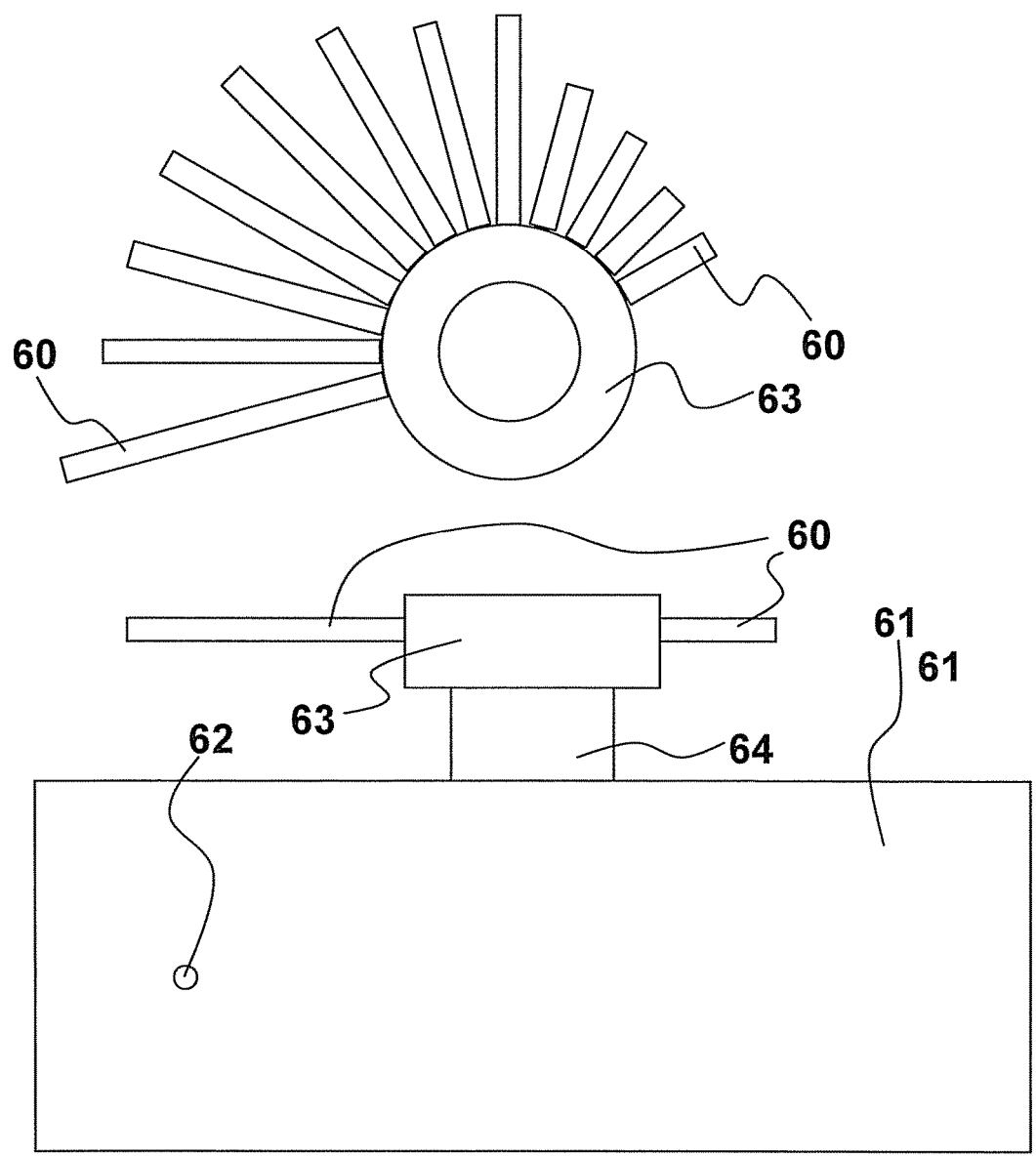
Figure 20:
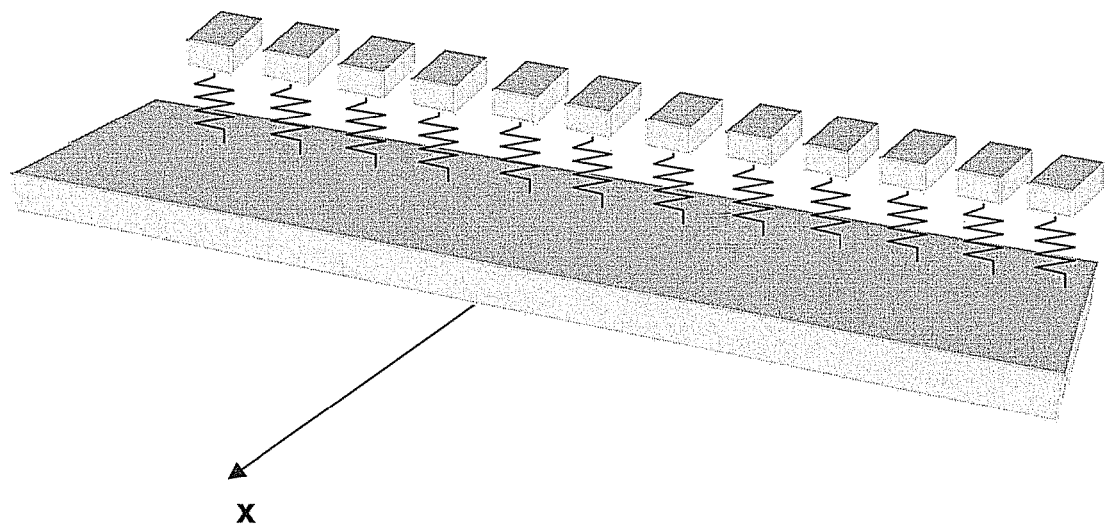
Figure 21:
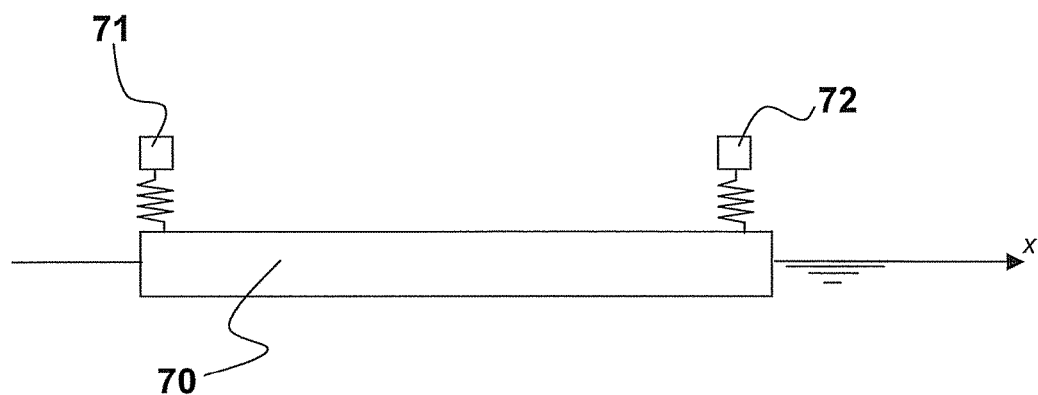
Figure 22:
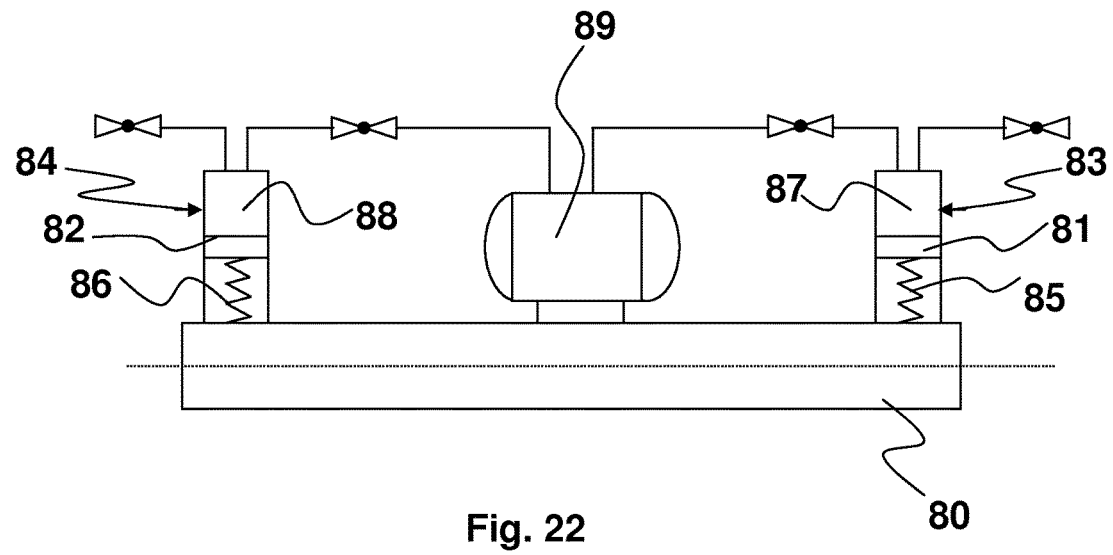
Figure 23A:
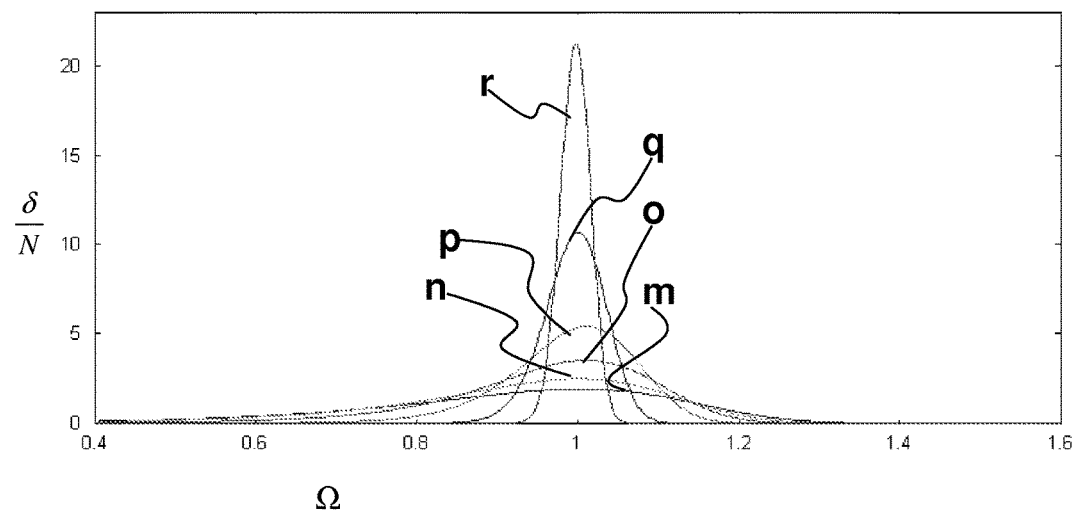
Figure 23B:
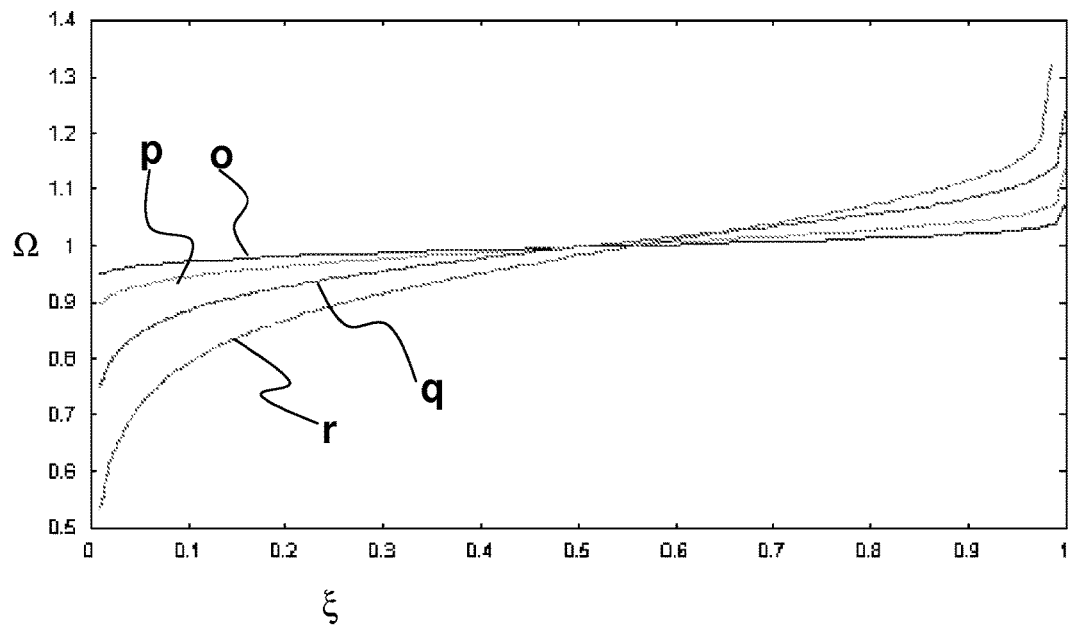
Figure 23C:
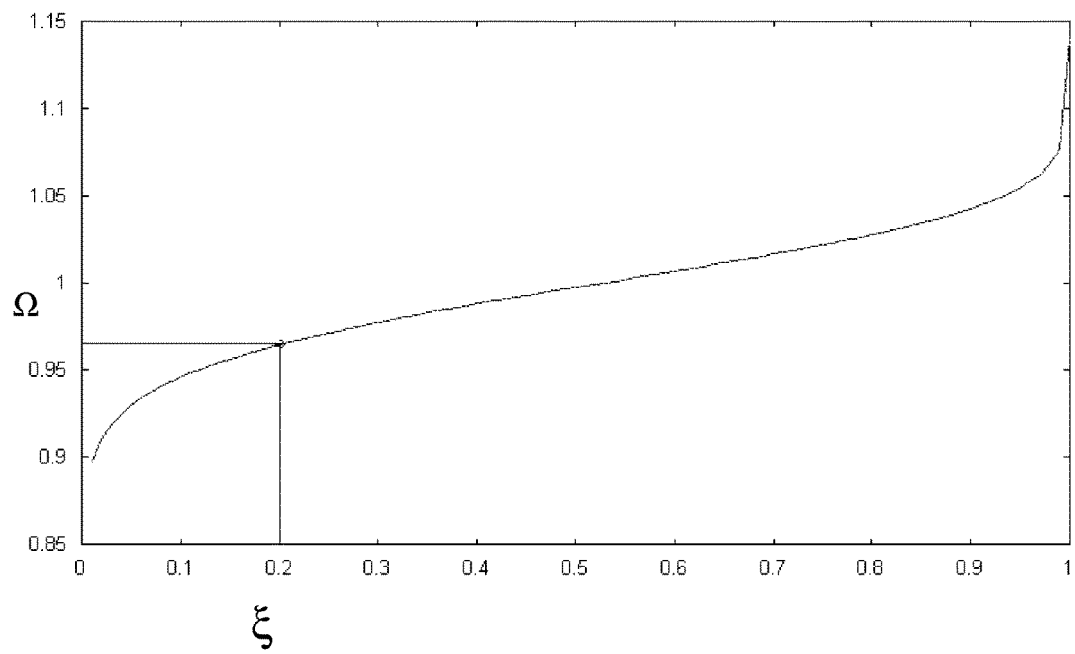
Figure 23D:
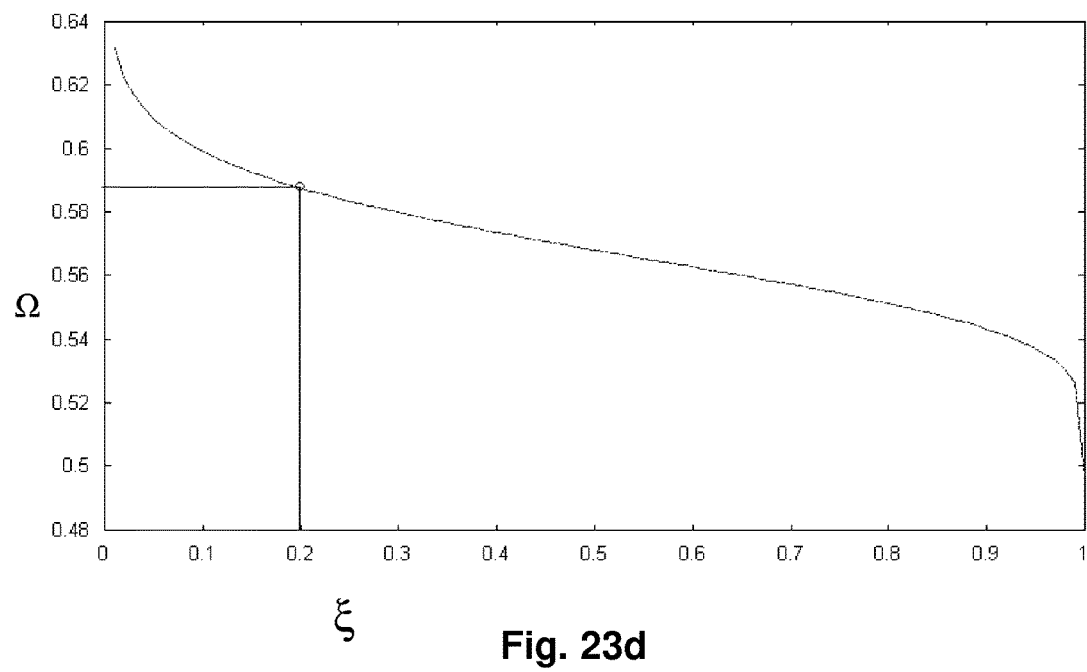
Figure 24:
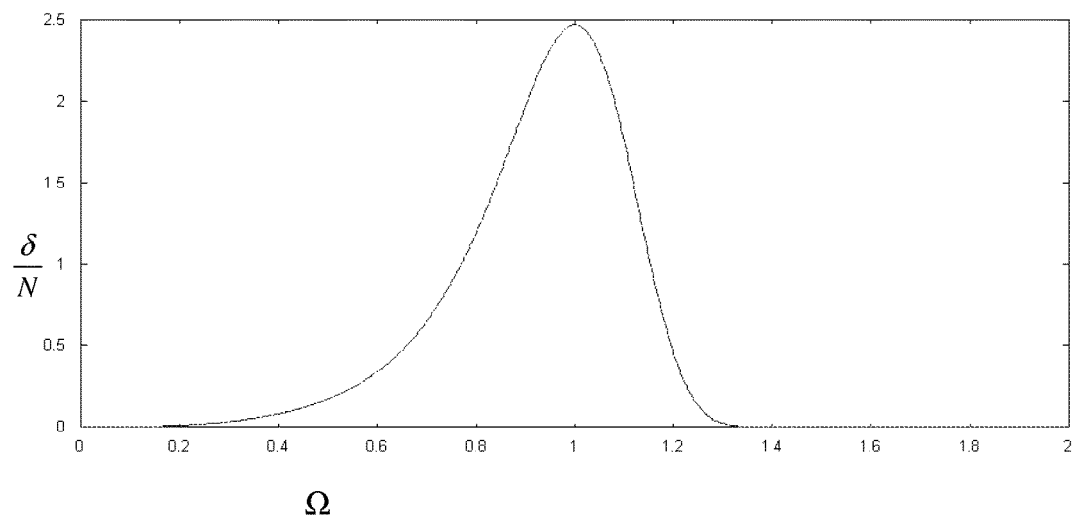
Figure 25:
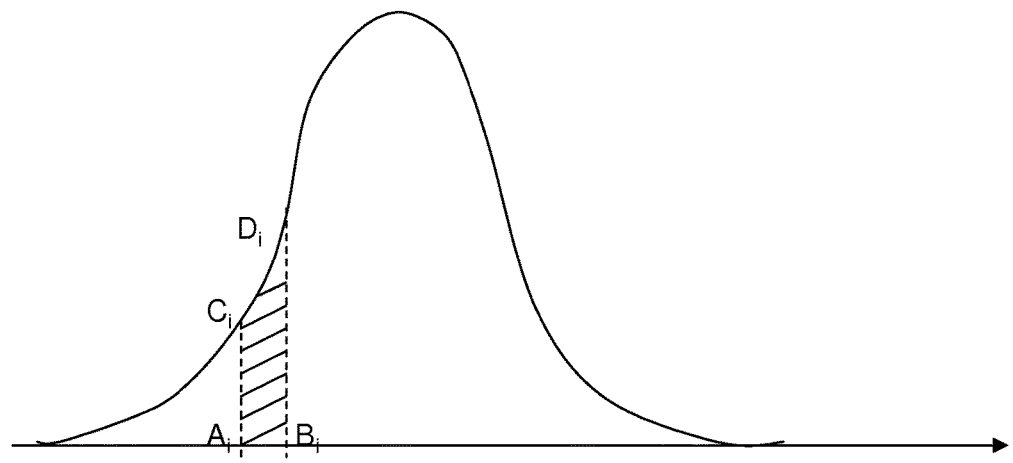
Figure 26:
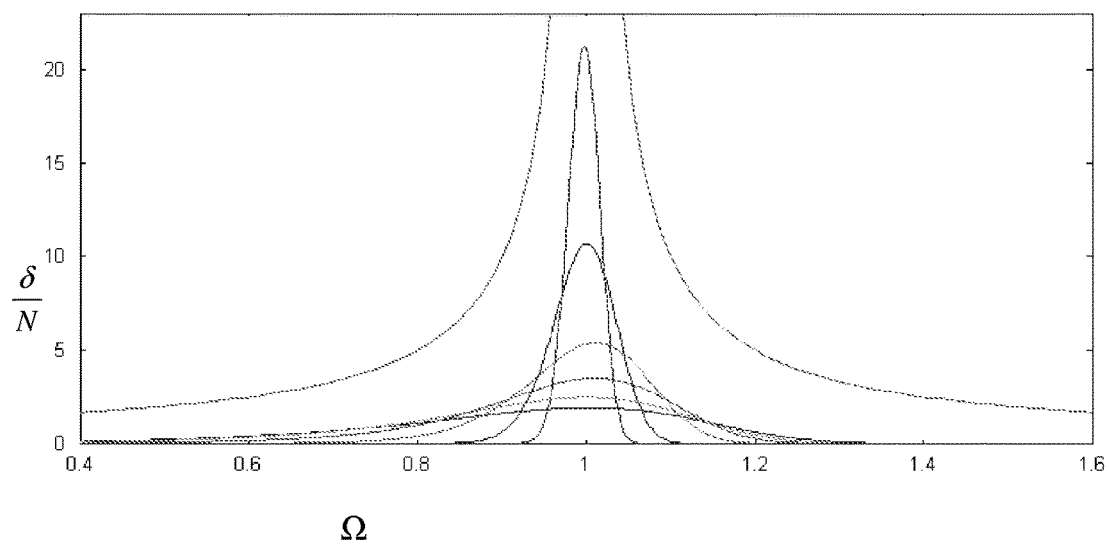

FIG. 1 shows a scheme of the damping device according to the invention;
FIG. 2 shows an embodiment of the damping device of the invention comprising a cluster of resonators;
FIG. 3 shows a scheme of an application of the damping device of FIG. 2 with the shape of a microstructure on a material
FIG. 4 shows the trend of the response to an impulse of a body without the damping device of the invention,
FIG. 5 shows the trend of the response to an impulse of a body with the damping device of the invention,
FIG. 6 shows a view of an embodiment of the damping device of the invention comprising adjusting means,
FIG. 7 shows a side view of the damping device of FIG. 6,
FIG. 8 shows a top view of a section of the damping device of FIG. 6,
FIG. 9 shows a top view of another embodiment of the damping device of the invention applied on a shaft,
FIG. 10 shows a side view of the damping device of FIG. 9,
FIG. 11 shows a schematic front view of another embodiment of the damping device of the invention applied to a building,
FIG. 12 shows a front view of a section of the damping device of FIG. 11,
FIG. 13 shows a top view of a section of the damping device of FIG. 11,
FIG. 14 shows a side view of a section of the damping device of FIG. 11,
FIG. 15 shows a schematic front view of another embodiment of the damping device of the invention applied to a railway structure,
FIG. 16 shows a side view of a section of the damping device of FIG. 15,
FIG. 17 shows another embodiment of damping device of the invention applied to an electromechanical system,
FIG. 18 shows another embodiment of damping device of the invention,
FIG. 19 shows another embodiment of damping device of the invention,
FIG. 20 shows another embodiment of damping device of the invention,
FIG. 21 shows another embodiment of damping device of the invention,
FIG. 22 shows another embodiment of damping device of the invention,
FIG. 23a shows a curve defining the resonators natural frequencies density of the resonators comprised in embodiments of the damping device of the invention,
FIGS. 23b, 23c, 23d show curves defining the natural frequencies distribution of the resonators comprised in embodiments of the damping device of the invention,
FIG. 24 shows a curve defining the density of natural frequencies of resonators of the damping device of the invention
FIG. 25 shows a curve defining the density of natural frequencies of the resonators comprised in the damping device of the invention,
FIG. 26 shows several curves defining the density of natural frequencies of resonators of the damping device of the invention.

DESCRIPTION OF PREFERRED EMBODIMENTS ACCORDING TO THE INVENTION

The FIG. 1 shows, for purpose of illustration, the basic scheme of the damping device according to the invention. A plurality of resonators 2, having a predefined frequency distribution, are connected in parallel to a common principal or "master" structure 1. An impulse applied to the master structure 1, here represented for the sake of simplicity by a single-degree-of-freedom system, starts the motion of the master structure 1, but its energy is progressively released to the set of resonators 2 that begin to vibrate.

The observation of the motion of the master structure 1, shows that it appears damped due to its transfer of energy to the set of resonators 2.

The motion of the resonators is initially phase-coherent causing an energy transfer from the master structure 1 to the set or cluster of resonators 2; subsequently, the motion of the resonators 2 becomes phase-incoherent so that the net force from the cluster to the master becomes almost zero preventing in this way energy from returning back to the master structure 1. However, generally and in the absence of damping, the energy initially absorbed by the cluster of resonators 2 would be transferred back to the master structure 1 after a certain period of time.

By defining appropriately the natural frequencies of the set of resonators 2 comprised in the damping device of the invention and their distribution along the damping device, two main effects are simultaneously obtained:

i) the energy absorbed by the cluster of resonators is definitely confined within the set of resonators and does not reflect back to the master;

ii) the rate of the energy transfer from the master to the cluster of resonators is maximized, producing a maximum damping effect on the master motion.

These advantages are achieved within the scope of the invention by appropriately defining the mass and/or the natural frequencies of the resonators comprised in the damping device according to the formula that is at the basis of the invention.

Hereafter is illustrated the theoretical demonstration of the formula. Let us consider the first point. If the number N of resonators is large, ideally infinite, but with constant total mass, the attached resonators produce a continuous distribution. The equations of the motion of the system are in this case:

$$\begin{cases} M\ddot{x}_M(t) + K_M x_M(t) + \int_0^1 k(\xi)(x_M(t) - x(\xi, t))d\xi = 0 \\ m\ddot{x}(\xi, t) - k(\xi)(x_M(t) - x(\xi, t)) = 0 \end{cases} \quad \text{equation (1)}$$

where M, $K_M$, $x_M$ are the mass, stiffness and displacement of the master structure, respectively; m, k, x the same quantities referred to any single resonator of the attached set. The first equation refers to the master, the second, varying $\xi$, to the resonators of the cluster.

From the second of equations (1), the displacement of the continuous set of resonators in terms of the master response can be determined by the convolution integral:

$$x(\xi,t) = \omega_n(\xi) \int_0^t x_M(\tau) H(t-\tau) \sin \omega_n(\xi)(t-\tau) d\tau$$

where H is the Heaviside function and $\omega_n(\xi) = \sqrt{k(\xi)/m}$. Substitution of this expression into the first of equation (1) produces:

$$M\ddot{x}_M(t) + K_M x_M(t) + x_M(t) \int_0^1 k(\xi) d\xi - \int_0^t x_M(\tau) \int_0^1 m\omega_n^3(\xi) H(t-\tau) \sin \Omega_n(\xi)(t-\tau) d\xi d\tau = 0$$

An integral-differential equation in terms of $x_M$ is determined. More concisely, letting:

$$\bar{k} = \int_0^1 k(\xi) d\xi, \quad L(t) = \int_0^1 m\omega^3(\xi) \sin \omega(\xi) t d\xi, \quad \hat{L}(t) = H(t) L(t)$$

the previous equation takes the simpler form:

$$M\ddot{x}_M(t) + (K_M + \bar{k}) x_M(t) - x_M(t) * [L(t) H(t)] = 0 \quad \text{equation (2)}$$

or $$M\ddot{x}_M(t) + (K_M + \bar{k}) x_M(t) + \dot{x}_M(t) * [I(t) H(t)] = 0 \quad \text{equation (3)}$$

$$I(t) = \int_0^1 m\omega^2(\xi) \cos \omega(\xi) t d\xi$$

where $$\hat{I}(t) = I(t) H(t)$$

is the kernel of the integral part of the previous equation.

Equation (3) implies that the interaction effect between the main structure and the cluster produces, besides a larger static stiffness $\bar{k}$ of the principal structure, a convolution term $\dot{x}_M(t) * \hat{I}(t)$, and the dynamic effect of the cluster is described by the kernel $\hat{I}(t) = I(t) H(t)$.

This last is produced from an integration of a sinusoidal function with variable frequency. Such an integral is simply evaluated by an asymptotic expansion for t large. It is proved that:

$$\lim_{t \to \infty} \hat{I}(t) = 0$$

$$\lim_{t \to \infty} \hat{L}(t) = 0$$

Looking at the mathematical expression of the kernel, this property has a physical counterpart: for late times the resonator vibrations become phase-incoherent producing on the main structure a net force that vanishes. The kernel has a peak for t=0, initial time at which the resonators are coherent, while, for late times, when the resonators becomes phase-incoherent, it vanishes.

While $\bar{k}$ has an obvious physical interpretation, less intuitive is the meaning of $\dot{x}_M(t) * \hat{I}(t)$. Using the seen asymptotic property and the theorem of the final value for the Laplace transform, it is easy to show that x(t) vanishes for large t. This argument proves that the convolution term $\hat{I}(t) = I(t) H(t)$ represents a dissipation term, i.e. an energy absorption mechanism in the motion of the principal structure. The equation of motion takes a different form in the case of a finite set of N resonators, since integrals over $\xi$ are now substituted by summation. Thus, equation (3) is still valid provided that $$\bar{k} = \sum_{i=1}^N k_i$$

and I(t) is replaced by its discrete counterpart $$s(t) = \frac{1}{N} \sum_{i=1}^N m\omega_i^3 \sin\omega_i t \quad \text{equation (4)}$$

$$M\ddot{x}_M(t) + (K_M + \bar{k}) x_M(t) - x_M(t) * [s(t) H(t)] = 0$$

The properties of the solutions of equations (3) and (4) are different because of the different kernels I(t) and s(t) appear. Thus, while I(t) confers damping-like properties to the master, the same is not obvious for s(t). In order to understand the damping capability in the case of a discrete set of resonators, explore the properties of the general sum:

$$h(t) = \frac{1}{N} \sum_{i=1}^N G[\omega(\xi_i)] \sin\omega(\xi_i) t$$

compared to the properties of the associated integral:

$$h_{int}(t) = \int_0^1 G[\omega(\xi)] \sin \omega(\xi) t d\xi$$

where $\xi$ is a dummy variable. $h_{int}(t)$ has the following asymptotic properties:

P1 - If $\dfrac{d\omega(\xi)}{d\xi} \neq 0 \; \forall \, \xi \in [0, 1]$, (P1)

then $h_{int} \propto \left(\dfrac{1}{t}\right) \to 0$ for $t \to \infty$

P2 - If $\dfrac{d\omega}{d\xi}(\xi_0) = 0 \; \xi_0 \in [0, 1]$, (P2)

then $h_{int} \propto \left(\dfrac{1}{t^{1/2}}\right) \to 0$ for $t \to \infty$

If the local property (P2) is extended to any points $\xi \in [0,1]$ then all the frequency are equal, $h_{int}(t)$ becomes a simple sine function and it is no more decaying.

Since h(t) is a discrete approximation of $h_{int}(t)$, their difference is given by the reminder term $h_{int}(t) - h(t)$:

$$\int_0^1 G[\omega(\xi)] \sin\omega(\xi) t d\xi =$$

$$\sum_{i=1}^N G(\omega_i) \sin\omega_i t + \frac{1}{2} \Delta\xi \frac{d}{d\xi} \{G[\omega(\xi)] \sin\omega(\xi) t\} \bigg|_{\xi=\xi_N(t)}$$

where $\xi_N(t) \in [0,1]$. Then:

$$h_{int}(t) - h(t) = \frac{1}{2N} \left\{ \frac{dG}{d\omega} \frac{d\omega}{d\xi} \sin\omega t + Gt \frac{d\omega}{d\xi} \cos\omega t \right\} \bigg|_{\xi=\xi_N(t)}$$

and:

$$|h_{int}(t) - h(t)| \le \frac{1}{2N} \max\left\{\left|\frac{d\omega}{d\xi}\right|\right\} \sqrt{\left(\frac{dG}{d\omega}\right)^2\Big|_{\xi=\xi_N(t)} + t^2 G^2\Big|_{\xi=\xi_N(t)}}$$

This expression shows a third interesting property:

P3—The upper bound of the quantity $|h_{int}(t)-h(t)|$ is proportional to $$\max\left\{\left|\frac{d\omega}{d\xi}\right|\right\}$$

with $\xi \in [0,1]$.

Properties P1, P2 and P3 suggest those frequency distributions leading to a nearly-vanishing h(t), i.e to the phenomenon of near-irreversibility. In fact, properties P1 and P2 show that $h_{int}(t)$ vanishes for any non-uniformly flat frequency distributions or for distributions presenting one or more stationary points $\xi_0$. Property P3 provides a criterion to make h(t) closer to $h_{int}(t)$:

$$\max\left\{\left|\frac{d\omega}{d\xi}\right|\right\}$$

must be small within the interval $\xi \in [0,1]$. It appears that those distributions of natural frequencies presenting stationary points (one or more) within the interval $\xi \in [0,1]$ are the candidates to produce a nearly-vanishing impulse response h(t). In fact, in this case $h_{int}(t)$ vanishes for large times and, in addition, since around any stationary point the function $$\left|\frac{d\omega}{d\xi}\right|$$

is reasonably small, the value $$\max\left\{\left|\frac{d\omega}{d\xi}\right|\right\}$$

is also small. This implies that $|h_{int}(t)-h(t)|$ is small: thus, h(t) exhibits asymptotic properties close to those of $h_{int}(t)$, i.e. a decaying trend in the time history of h(t) is expected. Note, that the ratio $$\frac{d\omega}{d\xi}$$

is proportional to the modal density $\delta(\omega)$ of the structure. In fact, $$d\xi = \frac{1}{N}dn,$$

being N the total number of modes for $\xi \in [0,1]$, and dn the number of modes for $\xi \in [\xi, \xi+d\xi]$.

Therefore, $$\frac{d\omega}{d\xi} \propto \frac{d\omega}{dn} = \frac{1}{\delta(\omega)}.$$

If the natural frequency distribution exhibits one or more stationary points $\xi_0$, they correspond to singularity points $\omega_0 = \omega(\xi_0)$ in the structural modal density. Thus, if:

$$\frac{d\omega}{d\xi}(\xi_0) = 0 \text{ i.e. } \delta(\omega_0) \to \infty$$

a decaying trend in the impulse response of the structure is expected, even in the absence of any other dissipation effect produced by vibration damping material or by a damping device of the known art.

This means that the effect of damping observed in the motion of the principal structure, is completely independent of any energy dissipation effect, based on viscous properties of fluids or of bodies, on which are generally based traditional vibration dampers.

The previous theorical analysis leads to introduce in the natural frequency distribution within the cluster, points for which $$\frac{d\omega}{d\xi}(\xi_0) = 0$$

or, generally, points for which this quantity is small. These points are called frequency accumulation points.

The best frequency distributions that allow to produce pseudo-damping are determined on the basis of mathematical considerations. More precisely their form is determined by solving the following differential equation:

(equation 5) where:

$$\frac{1}{r\sqrt{2\pi}}\exp\left\{-\frac{1}{2}\frac{(\sigma-l)^2}{r^2}\right\}\frac{d\sigma}{d\omega}\frac{d\omega}{d\xi} = 1, \sigma = m\omega^3 \sin\omega t_0$$

m is the total mass of the cluster of resonators,
r is the bandwidth parameter, with $r < m\omega_M$
l is the tuning parameter, with $l < m\omega m^3$ and
$\omega(\xi)$ is the desired frequency distribution within the cluster.

Assigned r, m, l following the criteria shown ahead, the frequency distribution is determined by solving numerically the above differential equation.

However, since $$\frac{d\xi}{d\omega}N$$

is the density $\delta(\omega)$ of the resonators within the cluster, i.e. it counts the number of resonators contained within the frequency band d$\omega$, the previous equation produces directly an expression for $\delta(\omega)$). In fact, $$d\xi = \frac{1}{N}dn,$$

being N the total number of harmonics for $\xi \in [0,1]$, and do the number of harmonics for $\xi \in [\xi, \xi+d\xi]$. Therefore, $$N \frac{d\omega}{d\xi} \propto \frac{d\omega}{dn} = \frac{1}{\delta(\omega)}$$

the previous equation produces:

$$\delta_{opt} = \frac{N}{r\sqrt{2\pi}} \exp\left\{-\frac{1}{2}\frac{(\sigma-I)^2}{r^2}\right\} \frac{d}{d\omega}[G(\omega)\sin\omega t] \quad \text{(equation 6)}$$

A practical use of the previous equations is now presented. It is perfectly equivalent to use equations 5 or 6 to select the natural frequency of the resonators of the device, although they lead to different procedures illustrated ahead. The use of the following nondimensional form is more convenient for purposes of design of a damping device according to the invention:

$$\frac{1}{\sqrt{2\pi}} \exp\left\{-\frac{1}{2}[(\sigma/r)-(I/r)]^2\right\} \frac{d(\sigma/r)}{d\Omega} \frac{d\Omega}{d\xi} = 1,$$

$$\sigma/r = \frac{m\omega_M^3}{r}\Omega^3 \sin\Omega(\omega_M t_0)$$

where the nondimensional frequency $\Omega = \omega/\omega_M$ is considered, and $\omega_M$ is the natural frequency of the master to which the cluster is applied. Analogously for the modal density:

$$\delta_{opt} = \frac{N}{\sqrt{2\pi}} \exp\left\{-\frac{1}{2}[(\sigma/r)-(I/r)]^2\right\} \frac{d(\sigma/r)}{d\Omega},$$

$$\sigma/r = \frac{m\omega_M^3}{r}\Omega^3 \sin\Omega(\omega_M t_0)$$

The parameter $$t_0 = \frac{\pi}{4\omega_M}$$

is assigned, while the parameters can be varied depending on the considered application. The table below shows typical $$\frac{m\omega_M^3}{r} \text{ and } \frac{I}{r}$$

values for $$\frac{m\omega_M^3}{r} \text{ and } \frac{I}{r}.$$

TABLE 1

|  | $\frac{m\omega_M^3}{r}$ | $\frac{I}{r}$ |
|---|---|---|
| Case 1 - curve m | 2 | 0.94 |
| Case 2 - curve n | 2.5 | 1.375 |
| Case 3 - curve o | 3.333 | 2.166 |
| Case 4 - curve p | 5 | 3.5 |
| Case 5 - curve q | 10 | 7 |
| Case 6 - curve r | 20 | 14 |

Higher values of $$\frac{m\omega_M^3}{r} \text{ and } \frac{I}{r}$$

produce in general better performances of the damping device, provided that the fabrication technology of the resonators is sufficiently accurate to make resonators showing differences in their natural frequencies when placed consecutively in the damping device of the invention. The differences in the natural frequencies of resonators placed near to each other must be in the order of $1/\delta(\Omega)$ for $\Omega=1$.

The curves m, n, o, p, q, r shown in the FIGS. 23a, 23b reproduce the resonator frequency density corresponding to some cases given in the table 1.

Two procedures to determine the physical characteristic of the resonators of the cluster, namely their individual mass and stiffness, are presented to show practical uses of the optimal curves for making damping devices according to the invention. The first is based on the frequency distribution curve, the second is based on the resonator density curve. They are conceptually identical although involve a different technique of representation of the characteristics of a damping device of the invention.

The first procedure based on the frequency-distribution-curve starts with the choice of the parameters for example looking at the values of the table. For purpose of illustration consider the Case 5 for which the values are $$\frac{m\omega_M^3}{r} = 10 \text{ and } \frac{I}{r} = 7$$

Numerical integration of curve q of FIG. 23a produces the curve in FIG. 23c. Once the number N of the resonators is selected, on the y-axis the frequency associated to any of the resonators in the cluster is determined. For example, given N=100, and known the master natural frequency $\omega_M$, the resonator number 20 is found on the x-axis at the abscissa 20/N=0.2. The corresponding frequency value $\Omega$ is 0.97 to which corresponds the physical value of the natural frequency $\omega = \Omega_M = 0.97\omega_M$.

The second procedure based on the resonators density curve starts with the choice of the parameters $$\frac{m\omega_M^3}{r} \text{ and } \frac{I}{r}$$

for example looking at the values of Table 1. For purpose of illustration consider the Case 5 of table 1 for which we have the value $$\frac{m\omega_M^3}{r} = 10 \text{ and } \frac{l}{r} = 7$$

The following curve $$\delta_{opt}/N = \frac{1}{\sqrt{2\pi}}\exp\left\{-\frac{1}{2}[(\sigma/r) - (l/r)]^2\right\}\frac{d(\sigma/r)}{d\Omega},$$

$$\sigma/r = \frac{m\omega_M^3}{r}\Omega^3\sin\Omega(\omega_M t_0)$$

is plotted as in the FIG. 24.

The area under the curve is equal to 1. On the x-axis is represented the nondimensional frequency $\Omega$ while on the y-axis is the function $$\frac{\delta}{N},$$

where the number N is predetermined following some considerations according to which a higher N produces in general better performances of the damping device but costs and technical production problems are increased. The curve gives the number of resonators which must have frequencies within a given frequency band.

The following procedure leads to determine the natural frequencies of the resonators within the damping device:

a) The x-axis is subdivided into small frequency intervals and for each of them a small trapezium $A_iB_iC_iD_i$ in FIG. 25 is build whose upper side is a portion of the plotted curve;

b) The area of $A_iB_iC_iD_i$ is multiplied by the number N of resonators and the resulting number $N_{iAB}$ represents the number of the resonators of the device that must have natural frequency within the frequency interval $A_iB_i$.

c) The individual frequencies of the resonators belonging to the frequency interval $A_iB_i$ are determined by the relationship:

The steps a), b), c) are used for each of the frequency intervals of the x-axis.

$$\omega_{iAB} = \omega_{Ai} + \frac{\omega_{Bi} - \omega_{Ai}}{N_{iAB}}i,$$

$$i = 1, N_{iAB}$$

Once all the natural frequencies of the resonators $\omega_i$ of the device are determined by the illustrated procedure, their physical parameters can be determined.

The physical parameters to be determined depend on the realization of the resonators. If they are masses on elastic springs, the associated mass $m_i$ and the stiffness $k_i$, can be determined. For example, one can select the value for $m_i$ equal to $\mu$ such that the total mass of the resonators is $N\mu$. This could be an appropriate small fraction f of the mass M of the master structure, for example f=0.1. Thus, $$\mu = \frac{fM}{N}.$$

The individual stiffness of the resonators follows as $k_i = \mu\omega_i^2$

In the embodiment where the damping device comprise resonators consisting of beams, i.e. clamped-free beams, once the characteristic section of the beams is assigned by the width b and the thickness h, for example the same for all the resonators, providing the cross section area A, the material mass density $\rho$, the Young modulus E, and the cross section moment of inertia Y, then the length $L_i$ of each beam is determined on the basis of the calculated natural frequencies $\omega_i$. In fact:

$$L_i = 1.875\frac{1}{\sqrt{\omega_i}}\sqrt[4]{\frac{EY}{\rho A}}$$

For example, if the device is to be applied to a vibrating panel with one of its natural frequency at $\omega_M = 2\pi150$ rad/s with the following choice:

$E=2.1\cdot10^{11}$N/m², $\rho=7800$ kg/m³, $b=0.002$ m,
$h=0.002$ m the previous formula, with the parameters of Case 5 presented in the table, provides the distribution of the beam lengths within the cluster shown in FIG. 23d.

On the y-axis the length of the beam of the cluster (meter), on the x-axis the $\xi$=variable. The practical use of this graph is the following. Selected the number N of the resonators to be used within the damping device, for example N=100, all the lengths of the 100 beams of the cluster can be determined. For example the resonator number 20 is found on the x-axis at the abscissa 20/N=0.2. The corresponding length is $L_{20}=0.1077$ m.

By means of the definition of the characteristics of the resonators along the general formula indicated above, the damping device achieves thus the following advantages:

i) a suitable distribution of natural frequencies within the damping device can be selected in order to optimize the process of energy absorption by the cluster of resonators. More precisely, even in absence of any viscous damping mechanism connected to the vibrating body such optimized distribution retains the energy within the damping device without releasing it back to the principal structure;

ii) the damping device can include, purposely, impact effects in order to optimize the energy sharing among the resonators of the set, enhancing the energy absorption properties of a sink unit;

iii) It is possible to apply the damping device of a continuous structure, e.g. a panel, or a wall, to damp its motion, which is not possible by means of dampers of the known art, or at least is not as efficient. In this embodiment, a whole cluster of resonators is attached to a single point of a vibrating structure, to maximise the damping effect.

A single damping device according to the invention comprising resonators 2' in the shape of beams is shown in FIG. 2. The cluster of beams 2' are held by a common supporting structure 3, e.g. a bigger beam.

Different embodiments of damping devices comprising resonators distributed according to the procedure described which fall within the scope of the invention. All these damping devices use a resonators density curve that lies below the envelope curve described by the equation, $$e(\Omega) = \frac{1}{|\Omega - 1|}$$

as plotted in the FIG. 26.

Some embodiments of the damping device of the invention and some examples of specific applications to damp vibrations, oscillation or movements of structures are hereinafter illustrated.

In a first alternative embodiment of the device according to the invention the cluster of resonators 50 with the appropriate natural frequency distribution, determined using the formula set forth above, can be made by means of an electromechanical circuit.

FIG. 17 shows the case of a main structure, e.g. a beam, on which the piezoelectric device 52 is attached. It belongs to an electric circuit exhibiting natural frequencies that presents one or more condensation points. The circuit comprises a set of parallel inductive-capacitive circuits (L inductive elements, C capacities) defining the resonators 50, each having its own resonance frequency. The values of the resonance frequencies are distributed following the formula presented above.

The electrical resonators can be made by means of operational amplifiers that make up a circuit that is equivalent to that shown in FIG. 17.

In an alternative embodiment of the damping device according to the invention, the cluster of resonators according to the invention having the frequency distribution given by the formula set forth above, can be made also by means of acoustic ducts 60 connected to a room 61.

With reference to FIG. 18 a room 61, which is subjected to a noise or to an acoustic source 62 has a cluster of ducts $D_1, D_2 \ldots D_N$ on the side wall and communicating with the main room 61. The distribution of the lengths of the acoustic ducts produces an associated natural frequency distribution of their first natural frequencies that has a distribution according to the formula above. The acoustic ducts are considered as resonators for the purposes of the invention.

FIG. 19 shows a different embodiment of the damping device based on a set of acoustic ducts concentrated at a wall location in which the cluster of ducts 60 is fitted along the peripheral circumference of a cylindrical chamber 63 which is in communication with the main room 61 through the main duct 64.

Micro-Structured Material Incorporating a Damping Device According to the Invention.

In this application, a systematic distribution of a plurality of damping devices having micro-dimensions, like mini-beams with size of order $10^{-2}$ m or smaller, along a structure is provided. The number of damping devices depends on the size of the structure. An example of such an application is shown in FIG. 3, where the damping devices have a matrix distribution. A grid with a characteristic size L much smaller, several orders of magnitudes, with respect to the characteristic size of the system exhibits damping devices attached periodically to its matrix. The matrix is integral to the piece of structure to damp, e.g. an aircraft fuselage, a car body, a satellite panel, etc. Each damping device absorbs the local vibration energy from the matrix. Thus, the large scale motion of the matrix and the structure integral with it, is effectively damped.

Since the characteristic size of the damping device is very small compared to the dimensions of the structure, it can be considered part of the microstructure of the material. The resulting system, due to its special micro-structure, has the capability of converting its macro-scale oscillations into micro-scale vibrations of its microstructure, replicating, at an extreme large number of points, the effect shown by the curves of FIG. 5.

The impulse response of a structure with and without the damping device is compared in FIGS. 5 and 6.

Vibrating Surface with a Damping Device

FIG. 6 shows a damping device comprising resonators in the shape of beams, having a length of 5 to 30 cm, suitable to damp a vibrating surface. The damping device can have permanent fixed dimensions with a set frequency distribution for use in applications that have known and steady vibrations.

The device can incorporate also means for adjusting frequencies. An adjustment mechanism, is shown in FIGS. 6, 7, 8 which makes possible a shifting of the center frequency of the plurality of resonators to the desired value for a specific application.

The adjustment mechanism is a linear clamp that moves in and out to change the lengths of the mounted resonators, thus changing their frequencies to the desired values. These values can be indicated by means of marks on the external cover of the damping device.

The adjustment mechanism has a locking screw 10, a tuning screw 11, a support 12 to fix the housing 13 of the device to the master structure to damp. FIG. 7 shows a detail of the locking screw 10 acting on the sliding lock 14 that together with the pins 15 clamps the vibrating beams 2". The platform 16 solidarily fixed to the beams 2" is displaced back and forth by means of the tuning screw 11. The beams lengths from the clamped section to the free end is modified and consequently the condensation frequency of the cluster of resonators 2" can be suitably tuned. The device can be mounted on the vibrating surfaces in a number manners. It can have a threaded end that can be screwed onto a surface. It can be welded, glued, or attached through any other suitable method.

The damping device can also be applied to a rotating shaft 20 with a system of radially mounted beams 2''' fixed to a central support 22 as sketched in FIGS. 9 and 10. The shaft axis passes through the center of the central support 22 and the damping device 21 is mounted solidarily and coaxially to the rotating shaft 20. This application is suitable to damp torsional vibrations of the shaft 20.

Building Incorporating the Damping Device According to the Invention

The damping system shown as an example in FIGS. 11, 12, 13 and 14 represents a configuration to incorporate a damping device of the invention into the building structure. In FIG. 11 a schematic front view of a building structure is represented where the building is excited by a vibration of the base 33, e.g. an earthquake. The building structure vibrates and the floors 30 oscillate. The damping device consists of resonators in the shape of masses 31, eg of concrete or other appropriate building material, attached to the floors 30 by the vertical rods 32. FIG. 12 shows an enlarged section of the front view where the masses are fitted in the space 34 between the outer wall 36 and the inner wall 35 and attached to the floors by means of the rods 32. FIG. 13 shows the top view of the system where the pillars 37 are fitted into the same space 34 together with the masses 31 of the damping device. Finally FIG. 14 shows the side view of the system where the cluster of resonators or masses 31 appears.

Railway Structure Incorporating the Damping Device According to the Invention

FIGS. 15 and 16 show a damping device for damping vibrations excited by train wheels on rails 40 and on structures where the rails are laid. The rails transmit vibrations to the transverse support 41 and to the ballast 42. On a side of the ballast 42, and contained in the housing 43, there is a set of resonators, in the shape of masses 44, attached to the platform 45, integral with the ballast, by means of the flexible arms 46.

Floating Vessels Incorporating the Damping Device According to the Invention

FIGS. 20 and 21 show a scheme of the application of a damping device of the invention for damping the motion of a floating vessel 70. The damping device in this case consists of two pluralities or sets of parallel resonators 71 and 72. One set 71 of resonators is located at bow and the second set 72 is located aft of the floating vessel 70.

The two set of resonators cooperate to absorb the master's energy as in the other applications and is explained in the theoretical background above. The master structure corresponds to the floating vessel 70, oscillating under the influence of the waves, that transfers its energy to the two groups of resonators 71 and 72 at a rate controlled by the natural frequency distribution within the set of resonators.

System for Recovering Wave Energy Incorporating the Damping Device According to the Invention In this application, a device as that just described where the energy of exciting waves is transferred from the floating vessel 80 to the sets 83 and 84 of resonators is recovered in terms of a compressed gas filling a tank. FIG. 22 shows a scheme of the system.

There are provided two sets 83, 84 of resonators, each comprising a plurality of resonators, and all or only part of the resonators can have a floating mass 81, 82, which is supported by an elastic element 85, 86 The floating masses 81, 82 in their motion act as a piston in a respective pump chamber 87, 88. Through an appropriate circuit comprising automatic valves, air is compressed from the atmospheric pressure to the air tank 89 in which the air stored under pressure.

The invention claimed is:

1. A vibration damping device for damping vibrations of a vibrating or oscillating entity, adapted to be connected to the vibrating entity, the vibrating entity defining at least one respective natural frequency ($\omega_M$), wherein the damping device comprises:
    a predetermined plurality (N) of resonators arranged in parallel, wherein the resonators comprise solid masses shaped as beams,
    wherein the plurality (N) of resonators have respective natural frequencies ($\omega_i$), with values selected in accordance with a first formula:

$$\frac{\delta_{opt}(\Omega)}{N} = \frac{1}{\sqrt{2\pi}} \exp\left\{-\frac{1}{2}[(\sigma/r)-(I/r)]^2\right\} \frac{d(\sigma/r)}{d\Omega},$$

where: $\sigma/r = \frac{m\omega_M^3}{r} \Omega^3 \sin\Omega(\omega_M t_0)$ where $m\omega_M^3/r$ of value comprised in the range from 2 to 20, I/r of value comprised in the range from 0.94 to 14, $t_0 = \pi/(4\omega_M)$ are the parameters defining the first formula, I is the tuning parameter, with $1 < m\omega_M^3$, and r is the bandwidth parameter, where $\delta_{opt}$ is the modal density, m is the total mass of the plurality of resonators and r is the bandwidth parameter, with $r < m\omega_M$, wherein the density of natural frequencies of the plurality of resonators is comprised within a curve that lies below the envelope curve determined by a second formula, $e(\Omega) = 1/\Omega - 1$ where $\Omega = \omega_i/\omega_M$ is a nondimensional frequency, with i assuming values from 1 to N; and means for adjusting the natural frequency of the resonators comprising a tuning screw configured to move the beams and a linear clamp configured to selectively clamp the beams at different locations to change the effective free length of the beams.

2. The vibration damping device according to claim 1, wherein the plurality (N) of resonators comprises five or more resonators.

3. The vibration damping device according to claim 1, wherein the resonators are fixed to a common support structure, wherein the common support structure is, or is connected to, the vibrating entity.

* * * * *